March 14, 1950     W. R. JONTZ     2,500,686
TRAILER DOLLY
Filed Sept. 20, 1946     2 Sheets-Sheet 1
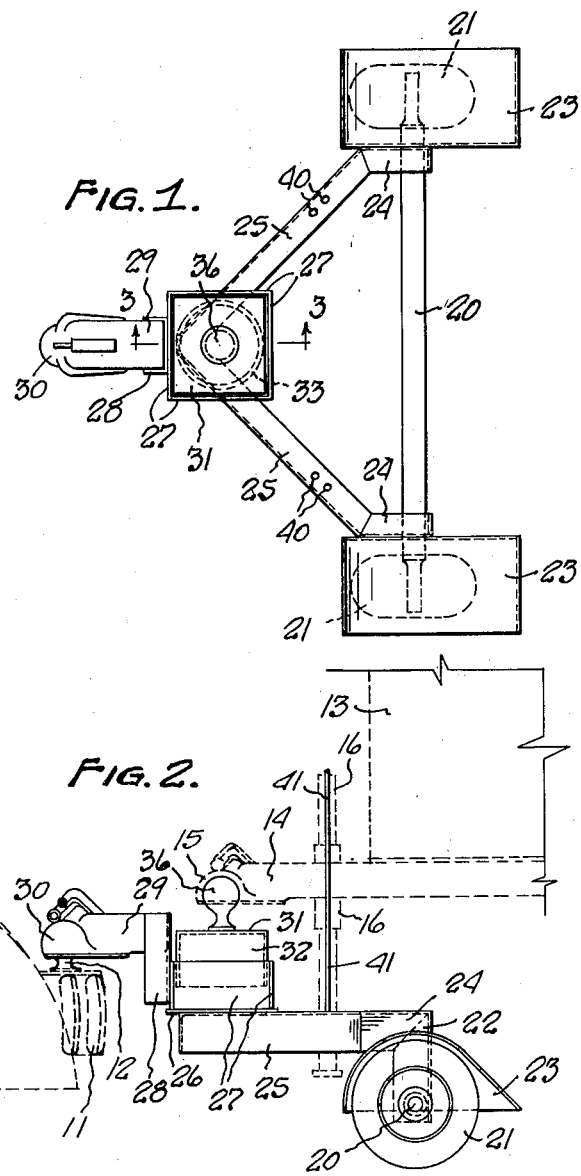
WILLIAM R. JONTZ.
INVENTOR
BY Oltsch & Knoblock
ATTORNEYS.

March 14, 1950 W. R. JONTZ 2,500,686
TRAILER DOLLY

Filed Sept. 20, 1946 2 Sheets-Sheet 2

WILLIAM R. JONTZ.
INVENTOR.

BY Oltsch & Knoblock
ATTORNEYS.

Patented Mar. 14, 1950

2,500,686

UNITED STATES PATENT OFFICE 2,500,686

TRAILER DOLLY

William R. Jontz, Mishawaka, Ind.

Application September 20, 1946, Serial No. 698,100

3 Claims. (Cl. 280—33.4)

This invention relates to improvements in trailer dollies or bogies and is particularly intended for use with house trailers and utility trailers which are commonly drawn by passenger autos as distinguished from heavy duty tractors such as trucks.

The primary object of the invention is to provide a novel, simple, effective and inexpensive trailer dolly for detachable connection with a tractive vehicle and provided with ground-engaging wheels, said dolly supporting at least a part of the weight of a trailing vehicle in a manner to reduce the portion of the trailer weight which is applied to the tractive vehicle.

A further object is to provide a trailer dolly with a novel spring arrangement positioned directly below the point of connection of the trailer with the dolly.

A further object is to provide a trailer dolly having a rigid frame mounting a coil spring associated with means for connecting the trailer thereto whereby said coil spring absorbs the impact and road shock, said coil spring being housed in a telescopic casing or like means for controlling the relative movement of the parts in a manner to limit lateral deflection of the spring.

A further object is to provide a trailer dolly with a rigid frame and a resilient mounting for a king-pin adapted for connection with a trailer, wherein said king-pin is associated with vertical guide means and resilient means for sustaining vertical components of thrust applied to said guide means, said connection including means for limiting relative movement of the guide parts in a separating direction.

A further object is to provide a novel, simple trailer dolly construction of requisite strength and durability provided with means for resiliently cushioning vertical components of shock applied thereto and provided also with means for avoiding the application of lateral torque or thrust to the spring cushioning means.

A further object is to provide a trailer dolly with means adapted to be connected to a lifting jack mounted upon a trailer, supported and connected with the dolly in a manner to accommodate lifting of the wheels of the dolly to an elevated position upon operation of the jack, whereby the dolly serves as a tongue projecting from the trailer for transmitting the weight of the forward end of the trailer directly to the tractive vehicle with which the dolly is connected.

Other objects will be apparent from the following specification.

In the drawing:

Fig. 1 is a top plan view of the dolly.

Fig. 2 is a side view of the dolly illustrating the manner in which the same is connected between a tractive vehicle and a trailer.

Fig. 4 is a vertical sectional detail view of a jack construction.

Figure 3:
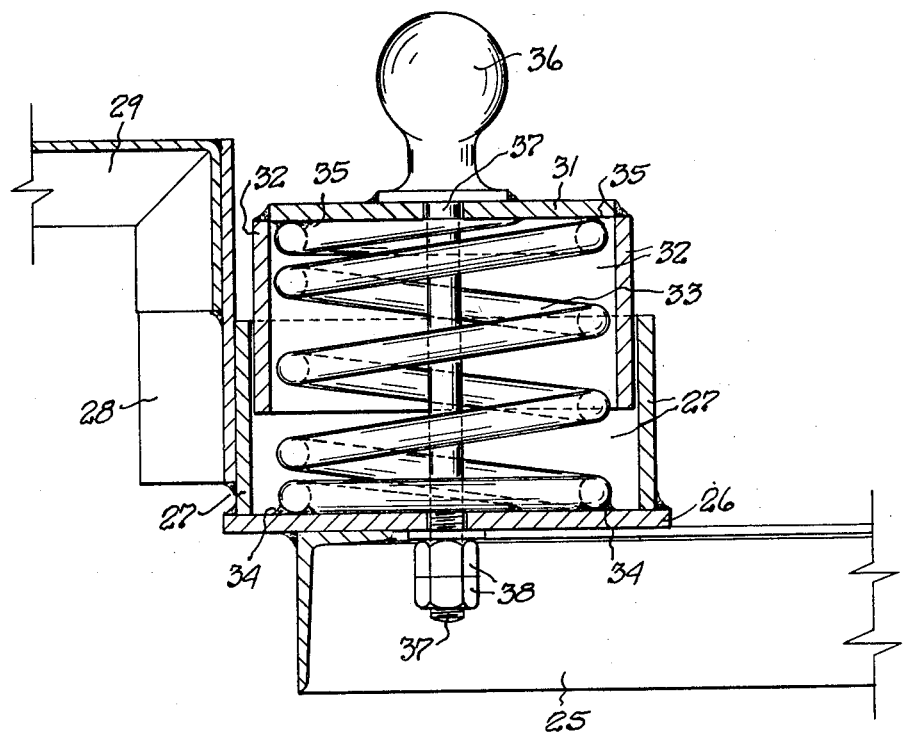
Fig. 3 is an enlarged vertical sectional detail view taken on line 3—3 of Fig. 3.

Referring to the drawing which illustrates the preferred embodiment of the invention, the numeral 10 designates a tractive vehicle, such as an automobile, which is provided with a rear bumper 11 upon which a king-pin 12 is mounted or supported. It will be understood that this arrangement of the parts is illustrative only and is intended primarily to illustrate one manner in which a tractive connection may be effected between a trailing unit and an automobile. The numeral 13 designates a trailer which is conventionally provided with a projecting tongue 14 mounting a socket connector 15 at its forward end which is adapted for universal connection with a king-pin. The trailer tongue 14 mounts a retractable jack 16 of any conventional or desired construction which is adapted to be raised to provide ground clearance when the trailer is connected to a tractive vehicle, and which is adapted to be lowered when the trailer is disconnected from the tractive vehicle and then serves the purpose of supporting the front end of the trailer at desired elevation. Thus the jack may be constructed as illustrated in Fig. 4 with a housing 50 mounted on tongue 14 to slidably receive and guide a vertical ram or shaft 51 provided with rack teeth or rack forming openings in which the teeth of one or more gears 52 mesh. Each gear 52 is mounted on a shaft 53 journaled in the housing and also mounts a worm gear 54 which meshes with a worm shaft 55 journaled in the housing. It will be understood that the particular construction of the tongue 14, the coupling 15 and the jack 16, as herein illustrated, are illustrative only and that any conventional arrangement of parts serving the same functions may be employed.

The trailer dolly is provided with an axle 20 upon whose opposite ends are mounted wheels 21. A rigid frame is supported upon the axle 20, being preferably formed of angle iron, channel stock or any other structural member of requisite strength. As here illustrated, the frame of the trailer dolly comprises a pair of rear vertically extending portions to which the trailer axle is secured adjacent the wheels 21. Suitable fenders 23 fit over the wheel 21, being held to place by suitable securing means fastening the same to frame parts 22. Each of the frame parts 22 has a forwardly projecting portion 24 projecting rigidly from the upper end thereof, and forwardly converging rigid frame parts 25 project from the forward end parts 24 and are interconnected forwardly of the wheels and centrally therebetween by any suitable means, such as rigid plate 26 or otherwise suitably secured to frame members 25 at the central forward portion of the frame. The plate 26 forms the base for a boxlike structure open at its upper ends and preferably defined by vertical marginal plates 27 which are welded or otherwise rigidly secured to plate 26 and project thereabove. A vertical frame member 28, which may be formed of angle iron, channel iron or any other suitable structural material, is secured to the front wall 27 and projects thereabove. A forwardly projecting tongue portion 29 is formed of structural material and is rigidly secured to the upper end of the upright 28. The tongue portion 29 rigidly mounts or has secured thereto a socket connector 30 of any suitable type which is adapted to fit over and interlock with the king-pin 12 to provide for pivotal connection of the dolly with the tractive vehicle 10.

An inverted cup-shaped member fits telescopically within the boxlike structure defined by the parts 26 and 27. As herein illustrated, the inverted cup-shaped structure comprises a top plate 31 from whose margin depend vertical plates 32 rigidly secured to plate 31 by welding and adapted for sliding guided clearance within the structure defined by the plates 27. A coil spring 33 is housed within the telescoping parts and is preferably welded at 34 to plate 26 at its lower end and at 35 to the plate 31 at its upper end. A king-pin 36 bears centrally upon the upper member 31 and is mounted upon a shaft 37 which extends through central openings in the plates 26 and 31, being positioned concentrically with the coil spring 33. Nuts 38 are threaded on the lower projecting end of the shaft 37 and provide means by which the telescoping parts may be adjusted to place the coil spring 33 under desired tension as well as providing means for preventing vertical separation of the telescoping parts.

As best illustrated in Fig. 2, the socket member 15 upon the tongue 14 of the trailer 13 is detachably connected with the dolly at the king-pin 36 thereof, whereby the point of application of the weight of the forward end of the trailer is directly above the coil spring 33. Thus, in normal operation of the parts, the load is applied directly to the spring without any tendency to include therein any lateral component or thrust. However, inasmuch as the towing of the trailer introduces a lateral thrust upon the king-pin 36 which tends normally to be transmitted thereby to the spring 33, a certain amount of lateral torque or thrust is applied to the spring. This lateral torque is definitely limited, however, by virtue of the telescoping interfitting relation between the inverted cup-shaped parts, and particularly the parts 27 and 32. In other words, parts 27 and 32 form vertical guides which accommodate the vertical thrust or shock to which the trailer is subjected in movement, but limit to only a very small possible extent the lateral thrust or torque which the spring is required to sustain. It will be observed in this connection that the centering action of the bolt 37 carried by the king-pin and passing through the telescopically interfitting parts tends to stabilize those parts and to prevent tilting of one relative to the other.

The operation of a trailer dolly of this construction serves very well for its intended purpose in forward travel of the tractor trailer combination. However, it will be apparent that by virtue of the double pivot provided between the king-pin 12 and the socket 30 and between the king-pin 36 and the socket 15, which pivotal points are spaced longitudinally with respect to each other, any backing of the tractor trailer unit is likely to be beset with difficulties due to the double joint. To overcome this difficulty I provide openings 40 in the parts 25 of the dolly frame rearwardly of the king-pin 15 and forwardly of the wheels 21. If desired a plurality of openings 40 may be provided. The purpose of these openings is to anchor the opposite ends of chains, cables or like parts 36 which are adapted to be passed over and anchored to the upper end of the ram 51 of the retractable jack 16 as best illustrated in Fig. 2. It will be apparent in this connection that when the jack 16 is elevated, the chains or cables 41 will pull upwardly upon the dolly frame and tilt it from the Fig. 2 position of the parts whereby the wheels 21 of the dolly will be lifted clear of the ground and the entire weight of the tractor trailer combination is supported by the wheels of the tractor and trailer vehicles. The tilting movement of the dolly is accommodated by the ball and socket joints 12, 30 and 15, 36. Inasmuch as the dolly has a rigid frame and its opposite sides are anchored by the opposite ends of the cable or chain 41 with respect to a center point of the trailer so that lateral play of the dolly is avoided, it becomes apparent that the dolly frame becomes an extension of the tongue 14 of the trailer and the pivotal connection between the trailer; and the tractive vehicle insofar as lateral pivoting is concerned is limited to the joint 12, 30 between the tractive vehicle and the dolly frame. However, it will be apparent that the rigidity aforementioned applies only with respect to transversely applied stresses. In other words, the resilience inherent in the spring 33 through which the weight applied to the king-pin is transmitted to the dolly frame is still retained. In other words, any vertical components of stress or road shock applied to the tractor trailer combination incident to backing movement or any other movement while the dolly wheels are held in elevated position is sustained by the spring 33.

While the preferred embodiment of the invention has been illustrated and described, it will be apparent that the construction herein described is merely illustrative and that other constructions which fall within the scope of the appended claims can be made without departing from the spirit of the invention.

I claim:

1. A trailer dolly comprising a rigid frame, wheels supporting one end of said frame, means for connecting the other end of said frame with a tractive vehicle, a king-pin, resiliently supported means mounting said king-pin at an intermediate part of said frame, guides cooperating with said frame and king-pin for restraining movement of said king-pin transversely of its vertical axis and means for limiting vertical movement of said king-pin relative to said frame.

2. A trailer dolly comprising a rigid frame, wheels supporting one end of said frame, means for connecting the other end of said frame with a tractive vehicle, a king-pin, resiliently supported means mounting said king-pin at an intermediate part of said frame, and guide means for limiting vertical movement of said king-pin relative to said frame and preventing lateral components of movement of said king-pin relative to said frame.

3. A trailer dolly comprising a wheel supported rigid frame, means for connecting said frame to a tractive vehicle forwardly of said wheels, a rigid cup-shaped member secured to said frame, an inverted rigid cup-shaped member having a snug telescopic vertically slidable fit with said first cup member, a coil spring encased in said interfitting cup members, and a king-pin fixedly supported on said second cup member, said king-pin having a shank extending centrally of said spring and shiftable relative to and mounting a stop engageable with said first member for interconnecting said cup members to prevent separation thereof.

WILLIAM R. JONTZ.

REFERENCES CITED

The following references are of record in the file of this patent:

UNITED STATES PATENTS

| Number | Name | Date |
|---|---|---|
| 1,325,162 | McGriff | Dec. 16, 1919 |
| 2,302,246 | Nelson | Nov. 17, 1942 |
| 2,325,822 | Whitmer | Aug. 3, 1943 |
| 2,410,241 | Schramm | Oct. 29, 1946 |
| 2,411,009 | Slimp | Nov. 12, 1946 |

FOREIGN PATENTS

| Number | Country | Date |
|---|---|---|
| 783,461 | France | July 12, 1935 |